(12) United States Patent
Georgeaud et al.

(10) Patent No.: US 11,280,011 B2
(45) Date of Patent: Mar. 22, 2022

(54) ELECTROLYTIC METHOD FOR EXTRACTING TIN AND/OR LEAD CONTAINED IN AN ELECTRICALLY CONDUCTIVE MIXTURE

(71) Applicant: VEOLIA ENVIRONNEMENT VE, Paris (FR)

(72) Inventors: Vincent Georgeaud, Andresy (FR); Auriane Diamand, Asnieres sur Seine (FR); Anne-Sophie Lescourret, Verneuil sur Seine (FR)

(73) Assignee: Veolia Environment VE, Paris (FR)

( * ) Notice: Subject to any disclaimer, the term of this patent is extended or adjusted under 35 U.S.C. 154(b) by 327 days.

(21) Appl. No.: 16/470,700

(22) PCT Filed: Dec. 19, 2017

(86) PCT No.: PCT/FR2017/053680
§ 371 (c)(1),
(2) Date: Jun. 18, 2019

(87) PCT Pub. No.: WO2018/115706
PCT Pub. Date: Jun. 28, 2018

(65) Prior Publication Data
US 2019/0309428 A1   Oct. 10, 2019

(30) Foreign Application Priority Data

Dec. 19, 2016 (FR) ...................................... 1662775

(51) Int. Cl.
*C25C 7/00* (2006.01)
*C25C 1/18* (2006.01)
(Continued)

(52) U.S. Cl.
CPC .................. *C25C 1/18* (2013.01); *C25C 1/14* (2013.01); *C25C 1/24* (2013.01); *C25C 7/02* (2013.01);
(Continued)

(58) Field of Classification Search
CPC .... C25C 1/18; C25C 7/02; C25C 7/00; C25C 1/00; C25C 1/22; C25C 1/14; C25C 5/02; C25C 7/08
See application file for complete search history.

(56) References Cited

U.S. PATENT DOCUMENTS 4,381,225 A * 4/1983 Everett .................... C25C 5/02
205/597
4,589,962 A   5/1986 Sajja et al.
(Continued)

FOREIGN PATENT DOCUMENTS

| CN | 1030450 A | 1/1989 |
| CN | 1056720 A | 12/1991 |

(Continued)

OTHER PUBLICATIONS

International Search Report (English translation provided) and Written Opinion for PCT/FR2017/053680 dated Mar. 13, 2018.
(Continued)

*Primary Examiner* — Zulmariam Mendez
(74) *Attorney, Agent, or Firm* — Patterson Thuente Pedersen, P.A.

(57) ABSTRACT

The invention related to a method for extracting tin and/or lead contained in an electrically conductive mixture derived from waste, using a solution comprising methane sulphonic acid as an electrolytic solution.

10 Claims, 2 Drawing Sheets

(51) Int. Cl.
*C25C 1/14* (2006.01)
*C25C 7/02* (2006.01)
*C25D 21/18* (2006.01)
*C25C 1/24* (2006.01)
*C25D 3/32* (2006.01)
*C25D 3/36* (2006.01)

(52) U.S. Cl.
CPC ............ *C25D 3/32* (2013.01); *C25D 3/36* (2013.01); *C25D 21/18* (2013.01)

(56) References Cited

U.S. PATENT DOCUMENTS

| | | | |
|---|---|---|---|
| 4,650,553 | A | 3/1987 | Felgendreger et al. |
| 4,662,999 | A | 5/1987 | Opaskar et al. |
| 4,885,064 | A | 12/1989 | Bokisa et al. |
| 5,620,586 | A * | 4/1997 | Claessens ............... C25C 7/00 205/571 |

FOREIGN PATENT DOCUMENTS

| | | |
|---|---|---|
| CN | 1141966 A | 2/1997 |
| CN | 101033557 A | 9/2007 |
| CN | 101935848 A | 1/2011 |
| CN | 102330112 A | 1/2012 |
| CN | 102677094 A | 9/2012 |
| CN | 103510109 A | 1/2014 |
| CN | 104746098 * | 3/2015 ............ C25C 1/18 |
| CN | 104746098 | 7/2015 |
| EP | 0770708 A1 | 5/1997 |
| JP | S61-76695 | 4/1986 |
| JP | S 62230994 A | 9/1987 |
| JP | 1992009490 A | 1/1992 |
| JP | H 0320089 | 11/1992 |
| JP | H 07197286 A | 8/1995 |
| JP | H 0835088 A | 2/1996 |
| JP | 2003171788 A | 6/2003 |
| KR | 10-1233779 | 2/2013 |

OTHER PUBLICATIONS

Office Action dated Oct. 27, 2020 for Chinese Application No. 201780076348.0, 17 pages.
Office Action dated Nov. 16, 2021 corresponding to JP 2019-534742.

* cited by examiner

ELECTROLYTIC METHOD FOR EXTRACTING TIN AND/OR LEAD CONTAINED IN AN ELECTRICALLY CONDUCTIVE MIXTURE

RELATED APPLICATIONS

This present application is a National Phase entry of PCT Application No. PCT/FR2017/053680 filed Dec. 19, 2017, which claims priority to French Application No. 1662775 filed Dec. 19, 2016, the contents of each being incorporated herein by reference in their entireties.

TECHNICAL FIELD

The invention relates in general terms to the field of electrolytic methods or electrolyses. Embodiments relate in particular to a method for extracting tin and/or lead contained in an electrically conductive mixture derived from waste, this method using, as an electrolytic solution, a solution comprising methanesulfonic acid (designated by the acronym MSA) and one or more metal salts of methanesulfonate.

Within the meaning of the present document, waste means any solid element that may be taken off during the implementation of a process of production, transformation or use of a product consisting of a set of materials. This solid element may, for example, be a solid element that the holder thereof gets rid of or where he has the intention or obligation of getting rid of it and/or processing it subsequently.

BACKGROUND

Tin and lead are two metals recognized for greatly interfering with or even preventing the implementation of hydrometallurgical processes conventionally used in the mining and/or metallurgical sector.

In particular, the current tinning industry uses the phenomenon of galvanoplasty for depositing a film of tin on the surface of a metal for example. These tinning methods use various baths in their method, acid baths (fluoroboric or methanesulfonic for example) and/or basic baths (based on stannate for example), and at least one anode and one cathode at least partially immersed in at least one of these baths. This anode (referred to as the sacrificial anode) must be of high purity so that the deposition at the cathode is of good quality and also so that it has, in its subsequent utility, properties of brightness, adhesion, porosity and/or roughness and that are carefully controlled by firstly the addition of additives and secondly the density of current applied between the anode and the cathode.

However, one of the constraints related to these methods is that the concentrations of metals in the baths must necessarily be constant over time in order to obtain good quality and sufficient reproducibility of the required deposition. This is because, in the methods currently used, the method for tinning a part is considered to be complete when the thickness of the deposition at the cathode reaches a predetermined value.

There therefore exists a real need to provide an electrolytic method for extracting and recovering tin and/or lead, contained initially in an electrically conductive mixture derived from waste, overcoming these defects and drawbacks of the prior art, the electrically conductive mixture comprising a set of various metals. Good extraction of the tin and/or lead from the electrically conductive mixture is essential since these two elements are considered to be elements that are toxic for the subsequent recovery of other metals initially contained in this electrically conductive mixture.

There also exists a need to provide an electrolytic method for extracting tin and/or lead that can be effective without its being necessary to check the concentrations of metals in the bath, and without the end of the process being indicated by a predetermined deposition thickness.

SUMMARY

In order to solve the previously mentioned drawbacks, the applicant has developed a method with the objective of extracting tin and/or lead contained in an electrically conductive mixture derived from waste, the operating principle of which is based firstly on a selective electro lixiviation of the tin and/or lead contained previously in the electrically conductive mixture, and secondly on a direct electrodeposition of the tin and/or lead on an electrode. The method in accordance with embodiments of the invention can therefore be assimilated to a hybrid method situated between the conventional galvanoplasty methods and electro refining methods.

More particularly, the subject matter in accordance with embodiments of the invention is an electrolytic method for extracting tin and/or lead contained in an electrically conductive mixture derived from waste, the method being e characterized in that it comprises the steps of:

a) forming an anode from the electrically conductive mixture, b) preparing an electrolytic solution comprising methanesulfonic acid MSA (hereinafter referred to by the acronym MSA) at a concentration of between 150 g/l and 250 g/l, and tin methanesulfonate MSSn at a concentration of between 10 g/l and 60 g/l of tin and/or lead methanesulfonate MSPb at a concentration of between 5 g/l and 120 g/l of lead, c) providing a cathode, d) at least partly immersing the anode and cathode in the electrolytic solution, and e) applying an electric current between the anode and cathode in order, via an electrical device, by oxidation, to lixiviate the tin and/or lead of the anode, to allow the deposition on the cathode of the tin and/or lead initially contained in the electrically conductive mixture.

By virtue of the method according to embodiments of the invention, it is therefore possible to extract the tin and/or lead from an electrically conductive mixture given by an electrolytic method using electrolysis following the lixiviation of the tin and/or lead. This is made possible firstly by virtue of the application of a current between the cathode and anode which is the electrically conductive mixture, and secondly by the presence of an electrolytic solution based on methanesulfonic acid MSA. It should be noted that metal ions have a high limit of solubility in methanesulfonic acid MSA, which is in fact an electrolytic solution particularly suited to the deposition of tin and/or lead.

Electrically conductive mixture, within the meaning of the present invention, means a mixture consisting of a plurality of solid elements and comprising:

less than 50% by mass, with respect to the total weight of the mixture, of tin in metal form, less than 25% by mass, with respect to the total weight of the mixture, of lead in metal form, and more than 25% by mass, with respect to the total weight of the mixture, of metallic copper and/or metallic iron and/or metallic aluminium, and/or metallic alloy comprising copper and/or iron and/or aluminium.

In any event, the electrically conductive mixture derived from waste necessarily comprises a variety of solid elements. Therefore, within the meaning of the present invention, neither the sacrificial anodes produced and formed by pyro metallurgical processes for subsequent electro refining of the tin and/or lead, nor sacrificial anodes comprising tin, or even an alloy of SnPb, used in surface treatment industries for controlled electrodeposition of materials to be protected or embellished, will be considered to be waste. This is because these sacrificial anodes do not comprise a set of solid elements that are disparate in size and composition.

Lixiviation or lixiviating, within the meaning of the present invention, means solubilization of the tin and/or lead of the electrically conductive mixture following an application of an electric current between the anode and cathode.

Moreover, this method has the advantage of using a sacrificial anode consisting of a variety of solid elements and produced from the electrically conductive mixture that it is in particular not necessary to prepare for producing the anode. Moreover, it is also not necessary to check, during the implementation of the electrolytic method according to embodiments of the invention, the concentrations of tin and/or lead in the bath in order to assess the end of the electro lixiviation reaction. This is because the end of the electrolytic extraction method according to embodiments of the invention takes place as soon as there is exhaustion of the tin and/or lead at the anode and can in particular be remarked when a variation in the intensity of the current or voltage applied between the anode and cathode, or between the anode or cathode and a reference electrode, is observed.

Within the meaning of the present invention, exhaustion of tin and/or lead at the anode means that at least 80% of the tin and/or lead directly accessible physically and chemically at the anode has been solubilized and lixiviated.

According to this method, it is also possible to choose the quality of the required deposition so as to obtain at the cathode either a smooth or dendritic or powdery deposition. To do this, it is known that the morphology of the deposition depends among other things on the density of the current applied. It is mainly the density of current applied to the cathode that will promote one type of deposition in particular. However, adding certain reagents to the electrolytic solution may have an influence on the required form at an equivalent current density. Finally, the presence of certain metallic or mineral impurities in the electrolytic solution may have the same effect.

Advantageously, the method comprises a step of compacting the electrically conductive mixture carried out either before the step a) of formation of the anode, or subsequently. This step a) of formation of the anode may be carried out either prior to the step b) of preparing the electrolytic solution, or subsequently.

In this variant embodiment of the invention, the electrically conductive mixture may also be connected to an electrical conductor that may be in the form of a wire, a sheet, a grille or other.

Advantageously, after the performance of the step a) of forming the anode, this anode may be inserted in a metal basket. The metal basket is preferably chemically neutral and fulfils the role of electrical conductor and current distributor.

Preferably, the metal basket is made from titanium, stainless steel or carbon since these three materials have the advantage of being anodically stable in a methanesulfonic acid medium (hereinafter designated by the acronym MSA), that is to say they do not dissolve even in the presence of a current applied within the limits of the conditions of use of the invention in terms of current and voltage applied.

It should be noted that the compacting or arrangement in a basket of the electrically conductive mixture are two non-limitative solutions for producing the anode from them.

Advantageously, the electrically conductive mixture comprises less than 5% by mass, with respect to the total weight of the electrically conductive mixture, of any metal less noble than tin and lead, said metal being directly accessible physically and chemically to the electrolytic solution.

It should then be noted that the metals less noble than tin and lead directly accessible physically and chemically may be considered to be metals polluting or even degrading the electrolytic solution.

Metal less noble than lead and tin means, within the meaning of the present invention, any metal or metal alloy defined by an oxidation-reduction potential lower than that of lead and tin, the oxidation-reduction potential being obtained under standard conditions.

Any metal directly accessible physically and chemically means, within the meaning of the present invention, any metal all or part of the surface of which is in direct contact with the electrolytic solution.

For example and non-limitatively, mention can be made of zinc and aluminium as metals being less noble than lead and tin.

However, the electrically conductive mixture may all the same comprise a certain quantity of zinc and/or aluminium if these are not directly accessible physically and chemically to the electrolytic solution.

Not directly accessible physically or chemically to the electrolytic solution means, within the meaning of the present document, a metal or metal alloy coated by at least one other substance (metal, mineral, organic) or another metal alloy having a greater oxidation-reduction potential than tin and lead. In this way, the metal or metal alloy that are coated will not have an impact on the electro lixiviation reaction of the tin and lead.

For example, the metals or metal alloys are not directly accessible physically and chemically if they are passivated or oxidated on the surface.

It should also be noted that, for example, the chemical element zinc, although less noble in its metallic state than tin and lead, does not affect the principle of the invention in the case where it is present in the form of copper alloys such as brass, which is considered to be more noble than tin or lead.

Advantageously, the method according to embodiments of the invention may further comprise, at the end of step e), the following steps:

removing the metal basket and the cathode from the electrolytic solution, rinsing the metal basket with the electrolytic solution, and then with water, in order to recover all the residual tin methanesulfonate (hereinafter designated by MSSn) and/or residual lead methanesulfonate (hereinafter designated by MSPb) on the basket, and recovering at least the tin and/or lead deposited at the cathode.

Advantageously, the method according to embodiments of the invention further comprises a step for enveloping the metal basket with a porous envelope based on polymer in order to physically preserve the elements of the electrically conductive mixture wherein the largest dimension is greater than or equal to 20 µm.

For example, this envelope may be made from monofilament or multifilament polypropylene, the porosity of which makes it possible to preserve, in the basket, the particles having at least one dimension greater than 20 μm. This envelope may also comprise nylon, polyethylene, polytetrafluoroethylene or any other natural material resistant in particular to methanesulfonic acid.

However, it is also possible for the metal basket to comprise carbon fibers. In this case, the porous envelope and the metal basket form the same part in a single piece. It should be noted that no particle leaves the metal basket, only the ions in solution can migrate. Such an envelope therefore has the advantage of not interfering with the electrochemical migration of the lixiviated metal ions.

It should also be noted that the envelope may be produced with membranes that are crosslinked to a greater or lesser extent so as to enlarge or decrease the diameters of the pores of the porous envelope.

Advantageously, the electrolytic solution may further comprise a phenolic stabiliser and/or chloride ions and/or an antioxidant.

Advantageously, the cathode may be composed either of aluminium, or of steel, or of tin and/or of lead.

Advantageously, the density of the current applied may be between 150 and 400 $A/m^2$ at the cathode, the cathode being in the form of a plate.

It should be noted that, if the current density is lower than 150 $A/m^2$, the deposition effected at the cathode will have high adhesion properties and it will not be easy to detach it therefrom.

Easily detachable deposits, within the meaning of the present invention, means deposits that can be detached from the cathode by scraping or scratching, or by spraying a water jet on the surface of the deposition.

It should be noted that, if the current density is higher than 400 $A/m^2$, there are obtained, firstly, faradic reaction yields much less than 70%, and secondly a deposition at the cathode that is powdery and greatly contaminated by the electrolytic solution.

Moreover, if it is wished to recover only lead at the cathode, according to the invention the electrolytic solution need not necessarily comprise tin methanesulfonate and, if it is wished to recover only tin at the cathode, the electrolytic solution does not necessarily need to comprise lead methanesulfonate. It should also be noted that the metal or metals present in the electrically conductive mixture are recovered at the cathode in the same proportions, whatever the initial nature of the electrolyte, after the process is put in steady state.

BRIEF DESCRIPTION OF THE FIGURES

Other innovative features and advantages of the invention will emerge from a reading of the following description provided by way of indication and in no way limitatively, with reference to the accompanying drawings, in which the figures illustrate schematically examples of implementation of the method according to the invention.

For clarity, the identical or similar elements are marked by identical reference signs on all the figures.

DETAILED DESCRIPTION

The methanesulfonic acid (MSA) used in the example embodiments described below is defined by the CAS number 75-75-2. The tin methanesulfonate (MSSn) used in the embodiment described below is defined by the CAS number 53408-94-9 and the lead methanesulfonate (MSPb) is defined by the CAS number 17570-76-2.

Example 1: Implementation of the Invention According to a First Device

A first example of implementation of a method according to the invention will now be described with reference to FIG. 1.

Figure 1:
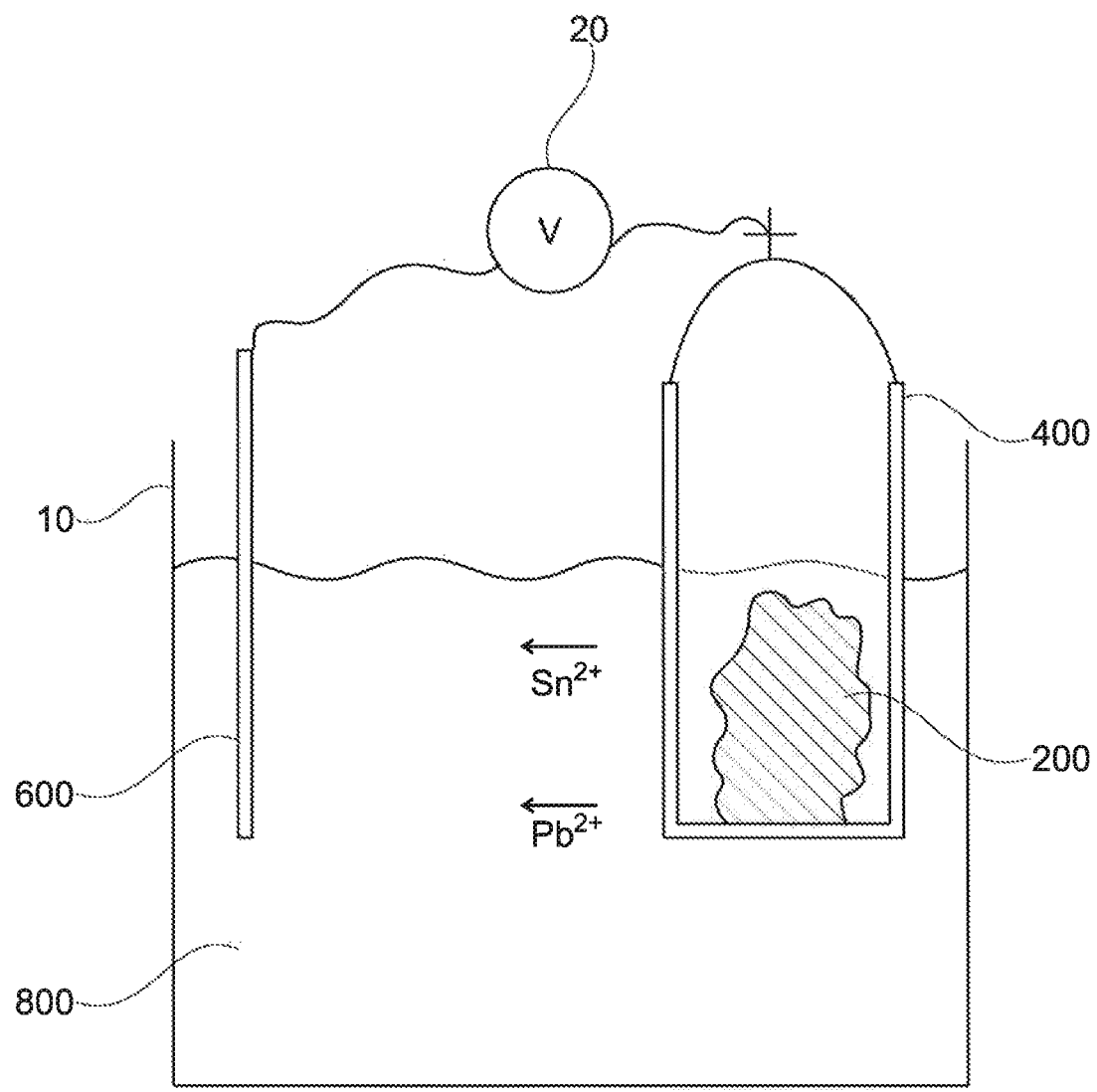
FIG. 1 shows a bath comprising an electrolytic solution in which a cathode and an anode are partly immersed, the anode being situated in a metal basket.

FIG. 1 shows a bath 10 comprising an electrolytic solution 800 in which a cathode 600 and an anode 200 are partly immersed, the anode 200 being situated in a metal basket 400. It should be noted that this metal basket 400 is stable with regard to oxidation and that it has the advantage of serving as an electrical conductor and current distributor. Thus it should be noted that this basket may also be enveloped in a porous envelope based on polymer in order to physically preserve elements of the electrically conductive mixture where the largest dimension is greater than or equal to 20 μm (not illustrated in FIG. 1).

The cathode 600 used in this example is in the form of a fine plate of aluminium, steel or tin. The active surface of this cathode 600 may be between 1 and 0.4 times the active surface of the anode 200.

The anode 200 includes an electrically conductive mixture derived from metal particles of waste comprising at least tin and/or lead, as well as other metals. The electrically conductive mixture is directly in contact with the electrolytic solution since the basket has pores.

Within the meaning of the present invention, metal particles means any metal element that may be in the form of irregular pieces of micrometric size or larger, or in particulate, filamentary or tubular form.

It should be noted that this electrically conductive mixture may further comprise metal particles of iron, copper, aluminium, nickel, titanium, arsenic, antimony, bismuth or precious metals such as for example gold, silver, etc.

The electrolytic solution 800 comprises tin ions and/or lead ions in solution in the electrolytic solution 800 comprising methanesulfonic acid MSA.

In particular, a first electrolytic solution 800 that can be used in this first example may comprise methanesulfonic acid, diluted or not with water, comprising, in an initial state before the electrolytic reaction commences, tin methane sulfonate (hereinafter designated by MSSn) at a concentration of 30 g/l of tin, and lead methanesulfonate (hereinafter designated by MSPb) at a concentration of 50 g/l of lead in solution in a solution of methanesulfonic acid comprising 170 g/l of acid.

A second electrolytic solution that can be used in the context of this first example may also comprise, in the initial state, tin methanesulfonate at a concentration of 50 g/l of tin in a solution of methanesulfonic acid comprising 200 g/l of acid.

A third electrolytic solution 800 that can be used in this first example may also comprise, in the initial state, lead methanesulfonate present at a concentration of 80 g/l of lead in a solution of methanesulfonic acid comprising 180 g/l of acid.

Each of the aforementioned three electrolytic solutions 800 may further comprise a phenolic stabilizer and/or chloride ions and/or an antioxidant.

Such a stabilizer has the advantage of preventing the oxidation of the $Sn^{2+}$ ion into $Sn^{4+}$ as well as the partial degradation of MSA over time.

Moreover, the chloride ions for their part have the advantage, in small quantities, of making it possible to limit passivation (that is to say the formation of surface oxides) of the metals included in the anode, and therefore facilitating the dissolution of these metals. It should be noted that such an addition of chloride ions has no impact on the performance of the electrolytic reaction.

Finally, the antioxidant for its part has the advantage of stabilizing the electrolytic solution 800, and particularly limiting the oxidation reaction so as to have an $Sn^{2+}$ concentration greater than that of $Sn^{4+}$.

It should be noted that, when the electrolytic solution comprises jointly tin methanesulfonate (MSSn) and lead methanesulfonate (MSPb), the MSSn/MSPb molar ratio in the electrolytic solution is preferably between 0.5 and 5.

The method according to the embodiment of the invention implemented by the device in FIG. 1 is based firstly on a selective electro lixiviation of the tin and/or of the lead contained previously in the electrically conductive mixture, and secondly on a direct electrodeposition of the tin and/or lead at the cathode 600.

In order to activate the electro lixiviation, and consequently electrodeposition at the cathode 600 of the tin and/or lead initially contained in the anode 200, the device according to FIG. 1 further comprises an electrical device 20 connecting the cathode 600 and the anode 200 so as to apply a current between them, circulating in the electrolytic solution 800.

To do this, it should be noted that, before or after the placing of the cathode 600 and anode 200 in the electrolytic solution 800, the cathode 600 and the anode 200 are electrically connected, by means of an electrical device 20, so that it is possible to apply an electric current between them.

Thus an electric current is then applied between the anode 200 and the cathode 600, via the electrical device 20, in order by oxidation to lixiviate the tin and/or lead of the anode 200, and also to allow the deposition of the tin and/or lead, initially contained in the electrically conductive mixture, on the cathode 600.

The current applied, in our first example, is a continuous current. However, it may also be a pulsed current, a continuous current with brief reversal in order to refresh the deposition surface and/or to lixiviate, or any other current generally used for electrodeposition. It should be noted that, if the constant current applied is around 10 A, a rapid drop in this intensity, from 10 A to 9 A for example, may mean that there is exhaustion of the tin and/or lead at the anode 200.

It should be noted that the electrolysis may also take place at constant voltage. For example, the lixiviation of the tin and/or lead ions and the conduct of the electrolytic method described here may be carried out in galvanic mode at constant voltage. It should also be noted that then the voltage applied may vary from 0.1 to 5 V depending on the nature of the cathode 600 used, and also according to the distance between the anode 200 and the cathode 600, and their form.

It should be noted that, in our configuration of the example, namely that the active surface of the cathode 600 is between 1 and 0.4 times the active surface of the anode 200, we can obtain high current densities, these densities being able in particular to be between 150 $A/m^2$ and 400 $A/m^2$. Preferably, the required current density is 250 $A/m^2$.

Such a current density will be preferred since it has the advantage of obtaining a powdery deposition and/or depositions that are easily detachable from the cathode at the end of the reaction, and also allowing reduction in the size of the electrolyzer while keeping high faradic yields, namely greater than 70%.

Moreover, during the electrolysis, the pH of the electrolytic solution 800 is not regulated and the end of the reaction is indicated mainly by the drop in a voltage in the case where the electrolysis is carried out at constant current, or by a drop in current when the electrolysis is carried out at constant voltage. The end of the reaction may also be indicated when either a change in the potential difference of the system comprising of anode 200 and cathode 600 is observed, or when a change in the potential difference of the system comprising of a working electrode and a reference electrode is observed, and the reference electrode would then have been arranged previously in the electrolytic solution 800 (galvano mode). All these drops are initially caused by depletion of the tin and/or lead at the anode 200, and secondly, which occurs only in extreme cases, by the release of another metal in the absence of tin and/or lead still directly accessible physically and chemically at the anode 200.

Optionally, a spectrophotometric system could for example be added to the device illustrated in FIG. 1 in order to observe the end of the electro lixiviation of the particles contained in the electrically conductive mixture, or in other words at the end of the electrolysis reaction.

Optionally, when, at the anode 200, there are no longer any tin and/or lead particles to be lixiviated, the metal basket 400 and the cathode 600 can be removed from the electrolytic solution 800.

After having removed the anode 200 with the metal basket 400, enveloped or not by the porous envelope, the metal basket is rinsed with the electrolytic solution 800, and then with water, in order to recover all the residual MSSn and/or MSPb ions and MSA.

For example, the basket is soaked in three consecutive rinsing baths, each bath comprising water in the initial state. By proceeding thus and during a plurality of implementations of the electrolytic process, it may be remarked that the first bath is enriched with methanesulfonate ions (hereinafter designated by MS) and metals that were previously present in the electrically conductive mixture so that its composition approaches that of the initial electrolytic solution 800. There is enough MS and metals for this first bath to be reintroduced into the electrolytic solution 800 as a makeup.

Then the second bath is passed into the first position and the third bath into the second position, and water is introduced into the third bath. This is a conventional washing mode. In another alternative, the residual metals contained in the metal basket could be emptied into a reverse-flow washing unit. This makes it possible to recover all the MSSn, MSPb and MSA forms in the electrolytic solution 800.

Next at least the tin and/or lead deposited at the cathode 600 is recovered. There may be, as a deposit at the cathode, an SnPb solid in metallic form. For example, the metals deposited at the cathode 600 constituting a mixture of tin and lead, the proportions of which are dependent on the initial ratio of these two metals in the initial electrically conductive mixture. The metals are recovered according to their physical characteristics in the form either of plates, sheets, or particles that it is necessary to filter and wash quickly before they are reprocessed in subsequent steps.

In the case where metals in ionic form situated in a small co-lixiviated proportion with tin and lead is concentrated in the electrolytic solution 800, specific processing operations could be implemented for separating/recovering them by means of ion exchange resins for example. In the case of its being impossible to extract all these small metals without impairing the quality of the electrolytic solution 800, a processing would be implemented for specific recovery (or recovery in a group) of each metal of interest. For example, this processing could involve selective precipitation/complexing and/or ion exchange resins and/or solvent extraction.

It should be noted that the device described in FIG. 1 may optionally comprise any device known to persons skilled in the art for checking and/or controlling certain parameters relating to the electrolytic solution 800, such as the temperature or the circulation or stirring thereof in the bath 10.

It should be noted that it is not the nature of the methanesulfonates initially contained in the electrolytic solution that controls the nature of the deposition over time, but rather the nature of the metals initially contained in the electrically conductive mixture constituting the anode 200.

Moreover, it should be noted that, in the presence on the one hand of an electrolytic solution free from lead methanesulfonate and comprising tin methanesulfonate, and on the other hand an electrically conductive mixture constituting the anode 200 and comprising as much lead as tin, the tendency over time will be towards a deposition at the cathode that will comprise as much tin as lead. However, the nature of the electrolytic solution will vary over time.

Thus either use is made of an electrolytic solution comprising initially MSSn and MSPb having the same ratios as the Sn/Pb present at the anode, or use is made of an electrolytic solution comprising either MSSn or MSPb.

Example 2: Implementation of the Invention According to a Second Device

A second device for implementing the invention will now be described in this second example with reference to FIG. 2.

Figure 2:
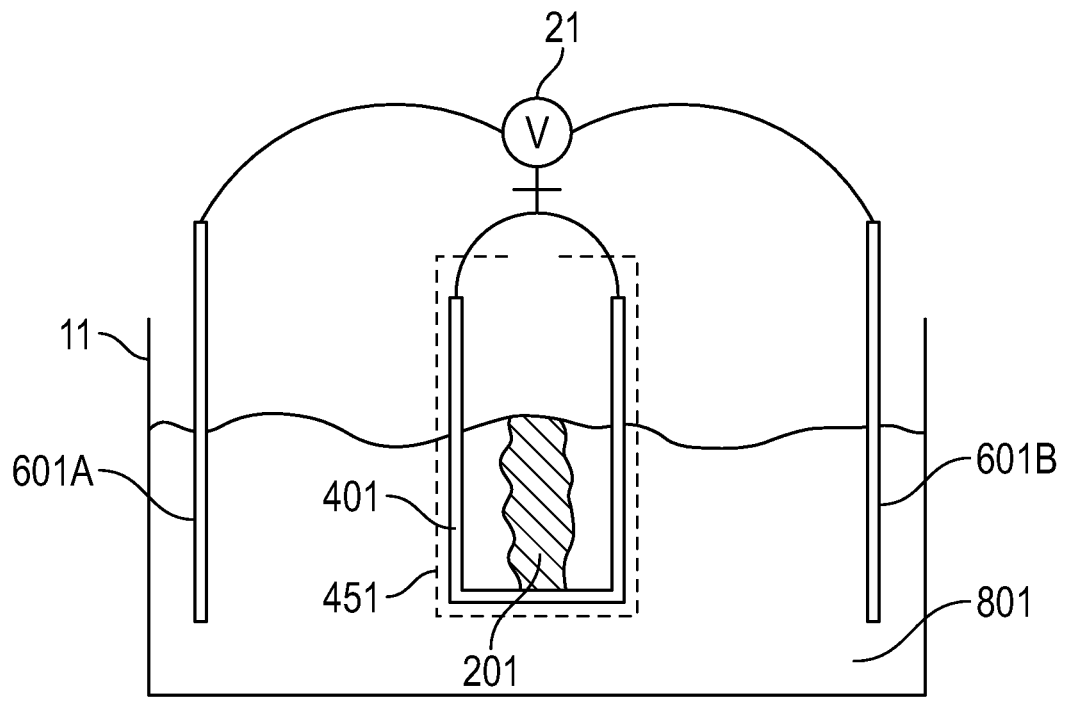
FIG. 2 shows a bath comprising an electrolytic solution in which two cathodes, a first cathode and a second cathode, and an anode, are partly immersed.

FIG. 2 shows a bath 11 comprising an electrolytic solution 801 in which two cathodes, a first cathode 601A and a second cathode 601B, and an anode 201, are partly immersed. The anode 201 is situated in a metal basket enveloped in a porous envelope 451. This porous envelope 451 may typically be a sock.

The anode 201, formed here from an electrically conductive mixture comprising distinct particles of metallic copper, metallic nickel, metallic aluminium and metallic alloy $Sn_{60}Pb_{40}$, is inserted in a titanium basket 401, having pores to enable it to be immersed in the electrolytic solution 801, as a metal basket. In this second example, the particles are pieces of metal plates with a thickness of less than 1 mm and having a surface area of less than approximately 100 mm² and dimensions of less than approximately 40 mm.

In particular, the electrically conductive mixture of this second example that constitutes the anode 201 comprises:
  copper at a concentration by mass of approximately 58% with respect to the total weight of the mixture,
  nickel at a concentration by mass of approximately 12% with respect to the total weight of the mixture,
  aluminium at a concentration by mass of approximately 12% with respect to the total weight of the mixture, and
  an $Sn_{60}Pb_{40}$ alloy at a concentration by mass of approximately 18% with respect to the total weight of the mixture.

In order to activate the electro lixiviation and the electrodeposition at the cathodes 601A and 601B of the tin and lead contained initially in the anodes 201, the device according to FIG. 2 further comprises an electrical device 21 connecting the cathodes 601A and 601B and the anode 201 so as to apply a current between them, the current circulating in the electrolytic solution 801.

In this second example of an implementation of the invention, the titanium basket 401 serves as an electrical conductor for the anode 201 and is inserted in a porous envelope 451 comprising of a monofilament polypropylene fabric having a permeability to air of approximately 900 $m^3 \cdot m^{-2} \cdot h^{-1}$ and with a bubble point of approximately 65 µm (fabric offered by Sefar, ref. PP 25141 AN).

The titanium basket 401 and its porous envelope 451 are immersed in an electrolytic solution 801 composed of:
  methanesulfonic acid MSA at a concentration of 220 g/l of acid,
  tin methanesulfonate MSSn at a concentration of 16 g/l of tin,
  lead methanesulfonate MSPb at a concentration of 9 g/l of lead,
  and an antioxidant at 4 ml/l: as antioxidant, use is made for example of the Starglo Anti-Ox product marketed by Coventya.

The two cathodes 601A and 601B are made from 316L stainless steel and are placed in the electrolytic solution 801 on each side of an anodic assembly comprising of the anode 201, the titanium basket 401 and the porous envelope 451. A current in continuous mode is supplied between the titanium basket 401, which next transmits the current to the anode 201, and the two cathodes 601A and 601B with a constant current density at the cathodes of approximately 210 $A \cdot m^{-2}$.

During electrolysis, the difference in potentials between the titanium basket 401 and the cathodes 601A and 601B increases from 0.2 V to 0.7 V. When the difference in potentials reaches 0.7 V, the regulation of the electrolysis is changed from a constant-current mode to a constant-voltage mode. Electrolysis is stopped when the current density at the cathodes 601 and 602 decreases from 210 $A \cdot m^{-2}$ to less than 50 $A \cdot m^2$. The anodic assembly is removed from the electrolytic solution 801, drained and then washed with water.

The analysis of the residual metals still present in the assembly comprising the titanium basket 401 and the porous envelope 451 shows complete electro lixiviation of the SnPb alloy. Moreover, this analysis also shows in particular that the residual metals comprise 98% by mass of nickel with respect to the total weight of the nickel present in the initial electrically conductive mixture, and less than 99% by mass of copper with respect to the total weight of copper present in the initial electrically conductive mixture. Furthermore, no lixiviation of the aluminium is noted: the whole of the aluminium present in the initial electrically conductive mixture is still present after electrolysis.

The mass of deposition of SnPb reduced at each of the cathodes 601A and 601B represents 83% by mass of SnPb alloy with respect to the total weight of the SnPb alloy electro lixiviated at the anode, resulting, in this second example, in a slight enrichment of tin and lead of the electrolytic solution 801 during electrolysis.

Example 3: Implementation of the Invention According to a Third Device

A third device for implementing are embodiments of the invention will now be described in this third example with reference to FIG. 3.

Figure 3:
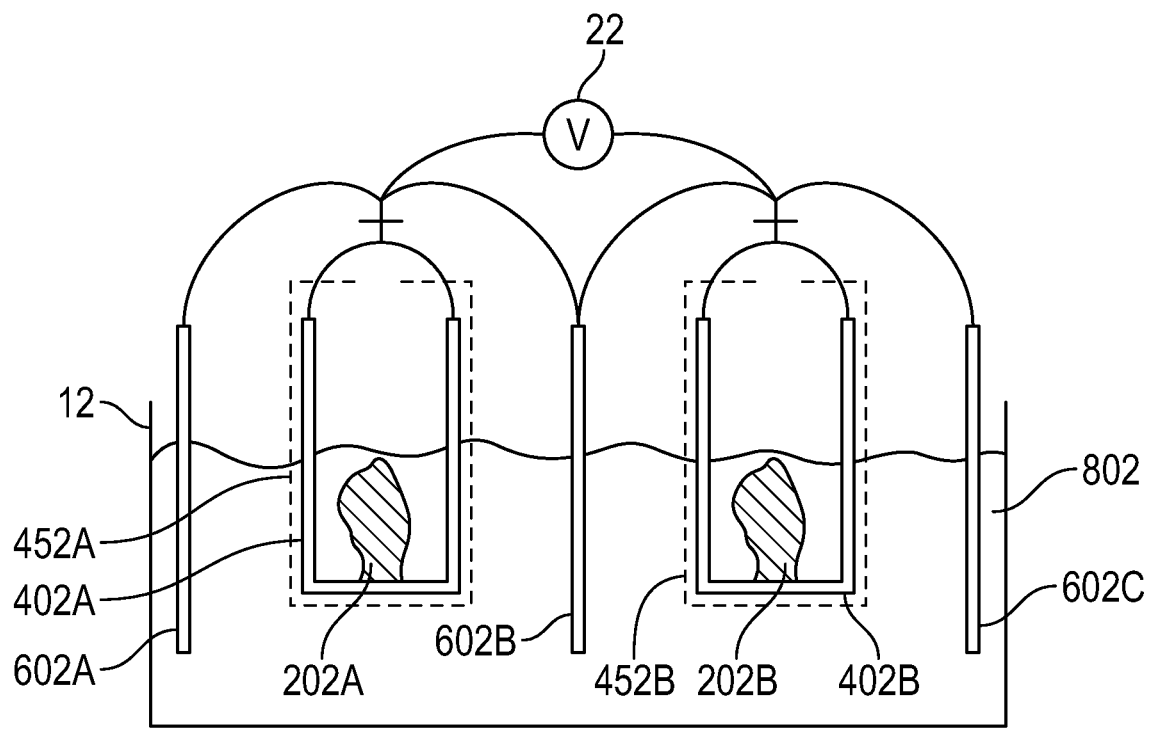
FIG. 3 shows a bath comprising an electrolytic solution in which there are partly immersed three cathodes and two anodes.

FIG. 3 shows a bath 12 comprising an electrolytic solution 802 in which there are partly immersed three cathodes (a first cathode 602A, a second cathode 602B and a third cathode 602C) and two anodes 202A and 202B, and two metal baskets 402A and 402B enveloped in a porous envelope 452A and 452B as in example 2. Each of the anodes 202A and 202B is situated in a metal basket 402A and 402B. Here the metal baskets 402A and 402B are made from titanium and, as with the other examples, serve as an electrical conductor for each of the anodes 202A and 202B containing them. The porous envelopes 452A and 452B are formed from a multifilament polypropylene fabric having permeability to air of approximately 800 $m^3 \cdot m^{-2} \cdot h^{-1}$ and a bubble point of approximately 55 μm.

The cathodes 602A, 602B and 602C are made from aluminium. The first cathode 602A and the third cathode 602C are placed in the electrolytic solution on each side of the bath 12, and the second cathode is placed between the two enveloped metal baskets 402A and 402B.

The electrolytic solution 802 is composed of methanesulfonic acid MSA with 226 g/l of acid and tin methanesulfonate MSSn with a concentration of 45 g/l of tin, no lead methanesulfonate MSPb is present in the initial state in the electrolytic solution 802.

This third example, with reference to FIG. 3, describes in particular an extraction of tin and lead contained initially in a single electrically conductive mixture derived from waste. This single mixture is then divided into six substantially equal portions. Each of these portions will be treated in pairs and will then be considered in pairs as being the two anodes 202A and 202B. Thus each of the two anodes 202A and 202B has the same composition. These two different anodes 202A and 202B are treated simultaneously by the same electrolytic solution 802 in order to reach a steady state.

The electrically conductive mixture from which the various portions are derived comprises particles of waste having various sizes of between 25 μm and more than 10 mm, and coming from a mechanical process of grinding waste from electrical and electronic equipment. This electrically conductive mixture consists, in this third example, mainly of:
- particles of metallic copper and metallic copper alloys,
- metallic aluminium and metallic aluminium alloys,
- metallic iron and metallic iron alloys,
- tin and metallic tin alloys that may contain lead (non-RoHs brazing alloys).

The chemical and metallogenic analyzes carried out on the electrically conductive mixture show that it comprises, in this third example:
- copper alloys at a concentration by mass of approximately 73% with respect to the total weight of the mixture,
- aluminium alloys at a concentration by mass of approximately 0.9% with respect to the total weight of the mixture,
- iron alloys at a concentration by mass of approximately 1.7% with respect to the total weight of the mixture, and
- tin alloys at a concentration by mass of approximately 18.7% with respect to the total weight of the mixture.

The electrically conductive mixture further comprises other solid elements such as for example particles comprising chemical elements such as O, S, Si, Ca, Br, As, Bi, Ag, Mo, Sb, etc. The sum of these latter solid elements are present at a concentration of approximately 5.7% by mass with respect to the total weight of the electrically conductive mixture.

In this example, the tin alloys contained in the electrically conductive mixture are improperly considered to be tin alloys containing mainly lead and wherein the ratio by mass calculated would show the presence of an average tin alloy of the $Sn_{80}Pb_{20}$ type.

These portions are introduced in pairs into the two assemblies comprising metal basket 402A/porous envelope 452A and metal basket 402B/porous envelope 452B, thus forming the two anodes 202A and 202B.

A continuous-mode current is applied between each metal basket 402A and 402B and each cathode 602A, 602B and 602C, via an electrical device 22, when the two metal baskets 402A and 402B are immersed in the electrolytic solution 802. The current has a constant current density at each of the cathodes 602A, 602B and 602C of approximately 250 $A \cdot m^{-2}$.

Each portion is then immersed in pairs, as presented below, in the same electrolytic solution 802. In other words, a first batch comprising two first portions is first immersed. Secondly, a second batch comprising two other portions is immersed. Then thirdly a third batch comprising the last two portions is immersed.

During electrolysis, the difference in potentials between the metal baskets 402A and 402B and the cathodes 602A, 602B and 602C increases from 0.2 V to 0.5 V. When the difference in potentials reaches 0.5 V, the regulation of the electrolysis is changed from a constant-current mode to a constant-voltage mode. Electrolysis is stopped when the current density of the cathodes 602A, 602B and 602C decreases from 250 $A \cdot m^{-2}$ to less than 190 $A \cdot m^{-2}$.

The anodic assemblies (metal basket 402A and 402B/porous envelope 452A and 452B/anodes 202A and 202B) are removed from the electrolytic solution 802, drained and then washed with water. The enveloped metal baskets 402A and 402B are emptied and the residual particles illustrating the first various fractions obtained following the treatment of this first batch are recovered. The cathodes 602A, 602B and 602C are removed and drained. The electrodeposited metals are recovered at the cathodes 602A, 602B and 602C by gentle scraping, washed with water, and then dehydrated.

Next the second batch is introduced into the enveloped metal baskets 402A and 402B previously emptied. The enveloped metal baskets 402A and 402B are next immersed in the electrolytic solution 802 previously used. The cathodes 602A, 602B and 602C with their deposits previously scraped off are placed in the electrolytic solution 802 as in the initial configuration. The same continuous-mode current as the one applied to the first batch is applied between the cathodes 602A, 602B and 602C and anodes 202A and 202B with regulation identical to that established for the first batch.

At the end of the reaction, the second various fractions obtained following the treatment of the second bath are also recovered with a protocol identical to the one operated on the first bath.

Next the third batch is introduced into the enveloped metal baskets 402A and 402B previously emptied. The enveloped metal baskets 402A and 402B are next immersed in the electrolytic solution 802 previously used. The cathodes 602A, 602B and 602C with their deposits previously scraped off are placed in the electrolytic solution 802 as in the initial configuration. The same continuous-mode current as the one applied to the first batch and to the second batch is applied to the third batch between the cathodes 602A, 602B and 602C and anodes 202A and 202B with regulation identical to that established for the first batch.

At the end of the reaction, the third various fractions are also recovered with a protocol identical to the one operated on the first and second batches.

The averaged separate chemical analyzes on the three different fractions recovered in the anodic assemblies (metal baskets 402A and 402B/porous envelope 452A and 452B) show a majority electro lixiviation of tin and lead to respective amounts of 88.3% and 86.5% with respect to the proportions analyzed in the raw waste. The other only very partially electro lixiviated metals are Ni, Al, Fe and Ca with respective ratios of 5%, 2.8%, 2.2% and 1.2% with respect to their contents analyzed in the initial electrically conductive mixture before treatment.

The chemical analyzes of the deposits at the cathodes 602A, 602B and 602C show the constant obtaining of $Sn_xPb_y$ alloys with a grade superior to 99.9%. The tin and lead contents in the average alloy over the three consecutive tests indicate an alloy of the type $Sn_{87}Pb_{13}$. The analyzes carried out separately on the three deposition batches at the cathodes 602A, 602B and 602C show a change from an alloy of the type $Sn_{99}Pb_1$ towards an alloy of the type $Sn_{80}Pb_{20}$, that is to say comparable with the composition of the tin alloys analyzed in the initial electrically conductive mixture before treatment.

The analyzes of change in the composition of the electrolytic solution 802 during the treatment of the three batches show a partial replacement of the tin methanesulfonate with lead methanesulfonate until equilibrium achieved at the end of the treatment of the second batch. The steady state in the conditions operated in this example is therefore reached at the end of treatment of the second batch.

The invention claimed is:

1. Electrolytic method for extracting tin or both tin and lead contained in an electrically conductive mixture derived from waste, said electrically conductive mixture consisting of a plurality of solid elements and comprising:
    less than 50% by mass, with respect to the total weight of the mixture, of tin in metal form,
    less than 25% by mass, with respect to the total weight of the mixture, of lead in metal form, and
    more than 25% by mass, with respect to the total weight of the mixture, of metallic copper and/or metallic iron and/or metallic aluminium, and/or metallic alloy comprising copper and/or iron and/or aluminium,
    the method comprising the steps of:
    a) forming an anode from said electrically conductive mixture,
    b) preparing an electrolytic solution comprising methanesulfonic acid at a concentration of between 150 g/l and 250 g/l, and tin methanesulfonate at a concentration of between 10 g/l and 60 g/l of tin and/or lead methanesulfonate MSPb at a concentration of between 5 g/l and 120 g/l of lead,
    c) providing a cathode,
    d) at least partly immersing said anode and cathode in the electrolytic solution, and
    e) applying an electric current between said anode and said cathode, via an electrical device, in order, by oxidation, to lixiviate the tin or both tin and lead of the anode, and to allow the deposition on the cathode of the tin or both tin and lead initially contained in the electrically conductive mixture.

2. Method according to claim 1, according to which the method comprises a step of compacting said electrically conductive mixture carried out either before step a) of formation of the anode or subsequently.

3. Method according to claim 1, according to which, after step a) of formation of the anode, this anode is inserted in a metal basket.

4. Method according to claim 3, according to which said metal basket is made from titanium, stainless steel or carbon.

5. Method according to claim 1, according to which said electrically conductive mixture comprises less than 5% by mass, with respect to the total weight of said electrically conductive mixture, of any metal less noble than tin and lead, said metal being directly accessible physically and chemically to the electrolytic solution.

6. Method according to claim 3, further comprising, at the end of step e), the following steps:
    removing said metal basket and said cathode from said electrolytic solution,
    rinsing said metal basket with said electrolytic solution and then with water in order to recover all the residual tin methanesulfonate and/or lead methanesulfonate on said basket, and
    recovering at least the tin or both tin and lead deposited at the cathode.

7. Method according to claim 3, according to which the metal basket is enveloped in a polymer-based porous envelope in order to physically keep elements of said electrically conductive mixture the largest dimension of which is greater than or equal to 20 μm.

8. Method according to claim 1, according to which the electrolytic solution further comprises a phenolic stabiliser and/or chloride ions and/or an antioxidant.

9. Method according to claim 1, according to which the cathode is composed either of aluminium, or steel, or tin and/or lead.

10. Method according to claim 1, according to which the density of the current applied is between 150 and 400 A/m$^2$ at the cathode, the cathode being in the form of a plate.

* * * * *